United States Patent [19]

Khafizov et al.

[11] Patent Number: 5,826,218
[45] Date of Patent: Oct. 20, 1998

[54] METHOD AND APPARATUS FOR SELECTING A COST EFFECTIVE CALL BLOCKING PROBABILITY DISTRIBUTION IN THE DESIGN OF A NEW CELLULAR NETWORK

[75] Inventors: Farid Khafizov, Dallas; Nikhil Jain, Plano, both of Tex.

[73] Assignee: Northern Telecom Limited, Montreal, Canada

[21] Appl. No.: 864,500

[22] Filed: May 29, 1997

[51] Int. Cl.⁶ .............................. H04Q 7/22; H04Q 7/36
[52] U.S. Cl. .................. 702/179; 455/450; 455/422; 455/445
[58] Field of Search .......................... 364/554; 455/403, 455/405, 422, 436, 445, 450, 451, 452, 453; 370/229, 235, 254, 310, 328; 375/200; 702/179

[56] References Cited

U.S. PATENT DOCUMENTS 5,134,709  7/1992  Bi et al. .................................. 455/33.1
5,285,494  2/1994  Sprecher et al. ........................... 379/59
5,519,884  5/1996  Duque-Anton et al. ................ 455/33.1

OTHER PUBLICATIONS

Kabasawa et al., "Characteristics of Mobile Communication Traffic in a Both Way Band–Shaped Service Area", IEEE, Oct. 1995.

Primary Examiner—John E. Barlow, Jr.
Assistant Examiner—Patrick Assouad
Attorney, Agent, or Firm—Carr & Storm, L.L.P.

[57] ABSTRACT

A method for optimizing the distribution of call blocking probabilities in the design of a new cellular system to minimize the total cost of the system. In most systems, the cost of cells including real estate, RF channels antenna construction, etc. comprises the most costly portion of the system. As allowable call blocking for a cell increases, the area coverage of the cells increases and thus the total number of cells required decreases for servicing a given area. Thus, the system should be designed having the maximum number of vocoders in the BSC and the maximum number of channel elements in each base station for initial system design with the number of channel elements thereof being optimized after the number of cells and placement thereof is finalized. The algorithm of the present invention, accomplishes the optimization by completing the design in the manner of the last sentence.

10 Claims, 2 Drawing Sheets

4,826,218

METHOD AND APPARATUS FOR SELECTING A COST EFFECTIVE CALL BLOCKING PROBABILITY DISTRIBUTION IN THE DESIGN OF A NEW CELLULAR NETWORK

TECHNICAL FIELD

This invention pertains generally to wireless communications systems and more particularly to an improved method for approaching the design process with an objective of optimizing the design to reduce overall system costs by appropriately distributing call blocking between the prime contributors thereof in the system.

BACKGROUND

The process of cellular planning for a startup network is different from that for an operational network in which coverage is extended through network rollout or the capacity is enhanced by way of cell division. Also the design process considerations are completely different from those involved where the electronics in an existing system are being upgraded in capacity or capability.

The first step in the process is to analyze the customer requirements. The assumption is that the network operator has marketing forecast on the number of customers, the customer growth, and the customer usage. This is followed by an initial cell layout, also sometimes known as the nominal cell plan. A decision must be made on whether the transmission path to connect the master switch, the base station controllers and cell site base stations by microwave links or by physical paths such as wire or optical fiber communication paths.

The nominal cell plan is used to find cell sites, and thereafter the cellular planning process is interlaced with the property acquisition process. The site candidates found to be consistent with the search areas in the nominal cell plan are then evaluated from a radio acceptance point of view. This evaluation is conducted partly using a prior art software planning tool such as PlaNET to find the best candidate. PlaNET is software that may be obtained from Mobile Systems International, Inc. Richardson, Tex. Candidate sites are also evaluated to meet the installation requirements (e.g., the civil works and provisioning of power, transmission plant, etc.). Site acquisition then commences, and the process continues until all sites are selected. Frequency planning can start once the sites have been selected. It is not until the final commissioning is due that the initial handoff and power control cell parameters' settings are determined prior to the system integration tests.

One of the parameters that has to be carefully considered during the planning process is call blocking. Call blocking may be defined as the prevention of completion, of an attempt by a customer to place a new call or to transfer a call from one cell in a cellular network to another cell, by the system because at least one part of the system has already reached its capacity limits. Another definition of call blocking, is the inability of the system to complete an attempted new call within a given time limit. Regardless of the definition of call blocking, an attempt is made to design the system such that the probability of call blocking does not exceed a given amount during the busiest hour of a typical day.

The call blocking can take place in several parts of a communication system, but in a mobile station cellular system the call blocking most often takes place in the RF portion due to lack of a sufficient number of available RF communication channels or in the wired portion. Call blocking in the wired portion of a cellular network primarily occurs due to the lack of channel elements (typically, lack of channel cards) at the BTS (base transceiver station) and/or VoCoders (VCs) (comprising a part of a SBS (Selector Bank Subsystem) block in a given specific system) portion of the base station controller (BSC). Given a total blocking probability BP for the RF and the wired network portion of the system by the customer or someone responsible for total system design, a system designer must distribute the blocking between the RF interface, the VCs and the BTSs. As previously mentioned, deployment of these resources is typically imprecise, due to the modular deployment of the channel elements and vocoders. Thus an attempt at optimum design or allocation of assets to obtain a minimum cost while staying within required design blocking parameters has typically entailed luck, experimentation and guesswork.

The prior art approach to designing a cellular phone system has generally been to assign some arbitrary value such as 5.0% to radio frequency (RF) call blocking. A system was then designed using prior art software and given traffic figures, terrain etc to find the number of cells and their placement. The software would generate data indicating how many cells would be required and equipment to handle that load was then selected. The resultant system was presented to the customer who decided whether or not it was economically feasible to proceed with a system. No specific consideration was given by anyone to optimally distributing the call blocking for minimal costs.

While these systems have operated satisfactorily, they have not been optimal in total system cost. Therefore, a need exists for a design process algorithm that distributes the call blocking probability between the prime call blocking contributors in a cellular system in a cost effective manner.

SUMMARY OF INVENTION

The present invention recognizes that the primary cost in a new cellular system is in the cellular site where the base station is located. These costs include not only the equipment located at the site, but also the cost of the real estate involved whether this involves renting or purchase. Other potential costs involve the acquisition of an adequate number of communication channels to service customers. Additional costs in the system include a master switch and its associated electronics as well as communication facilities between the master switch and base stations at each of the cell sites. Increasing costs in a new cellular system are dependent on primary cost variables such as the number of vocoders in the BSC necessary to accommodate all the customers with a given total blocking probability BP for periods of maximum traffic, the total number of channel elements in all of the base stations and the number RF channels used in the cell sites in the system to accommodate the expected number of customers.

Since the least expensive approach to minimizing call blocking within a cellular network is to maximize the number of vocoders in the BSC, the call blocking which would occur using the maximum allowable number of vocoders possible for a BSC that would be used in the system should be calculated first. Subsequently that call blocking probability value is assigned to a variable, "B_VC". Since the next least expensive approach to minimizing call blocking is to maximize the number of channel elements in each of the base stations, it is logical to initially use a minimum possible channel element call blocking probability of B_BTS. The initial value of B_BTS is obtained by calculating the call blocking using the maximum possible number of channel elements in each base station. Later in the design, the number of channel elements in individual cells may be decreased, if such a decrease does not adversely affect total system call blocking probability BP. A system is then designed where RF call blocking probability, "B_RF", in each cell is as close to a call blocking probability of $(BP-z)/(1-z)$ where $z=B\_VC+B\_BTS-B_{13} VC*B\_BTS$, without exceeding same, as possible. Once the system is designed, the actual call blocking probability B_BF for each of the cells is examined along with a determination as to whether the number of channel elements in that cell can now be decreased without exceeding the given total call blocking probability BP.

A different way of stating the above is to say that as allowable call blocking for a cell increases, the area of coverage of the cells increases and thus the total number of cells required decreases for servicing a given total area. Therefore, the system should be designed to have the maximum number of vocoders in the main switch and the maximum number of channel elements in each base station for initial system design. The number of channel elements is then optimized after the number of cells and placement thereof is finalized.

DETAILED DESCRIPTION

Figure 1:
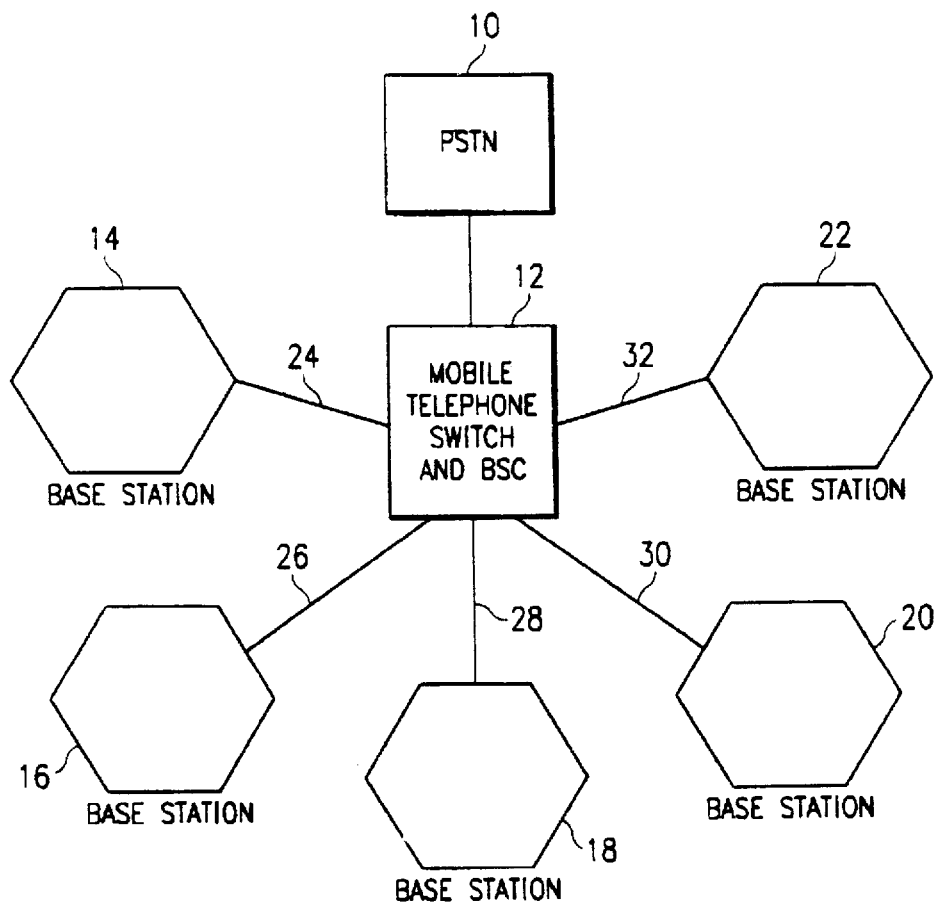
FIG. 1 is a block diagram of a representative cellular phone system used to explain the algorithm of the present invention.

In FIG. 1, a PSTN block represents the public switched telephone network. PSTN block 10 is linked to a mobile telephone switch 12, which is often referred to as a MTX or mobile telephone exchange. The MTX 12 is linked to five base stations (BS) 14, 16, 18, 20 and 22 by links 24 through 32 respectively as illustrated. While these links are typically physical such as copper or co-axial cable, the links may also be by radio, satellite or optical means. Transmitters and antennas (not shown) comprise an integral part of a base station and define a cellular area or cell coverage for each base station. These cells are typically illustrated as identical hexagonal blocks. In an actual communication system, these cells are more nearly circular and each one typically overlaps a plurality of adjacent cells. Therefore, mobile telephone users can move from cell to cell while maintaining an active call by noting the fading signal strength of communications near the edge of a present cell and an increasing signal strength of a nearby cell to which communications may be handed-over.

Figure 2:
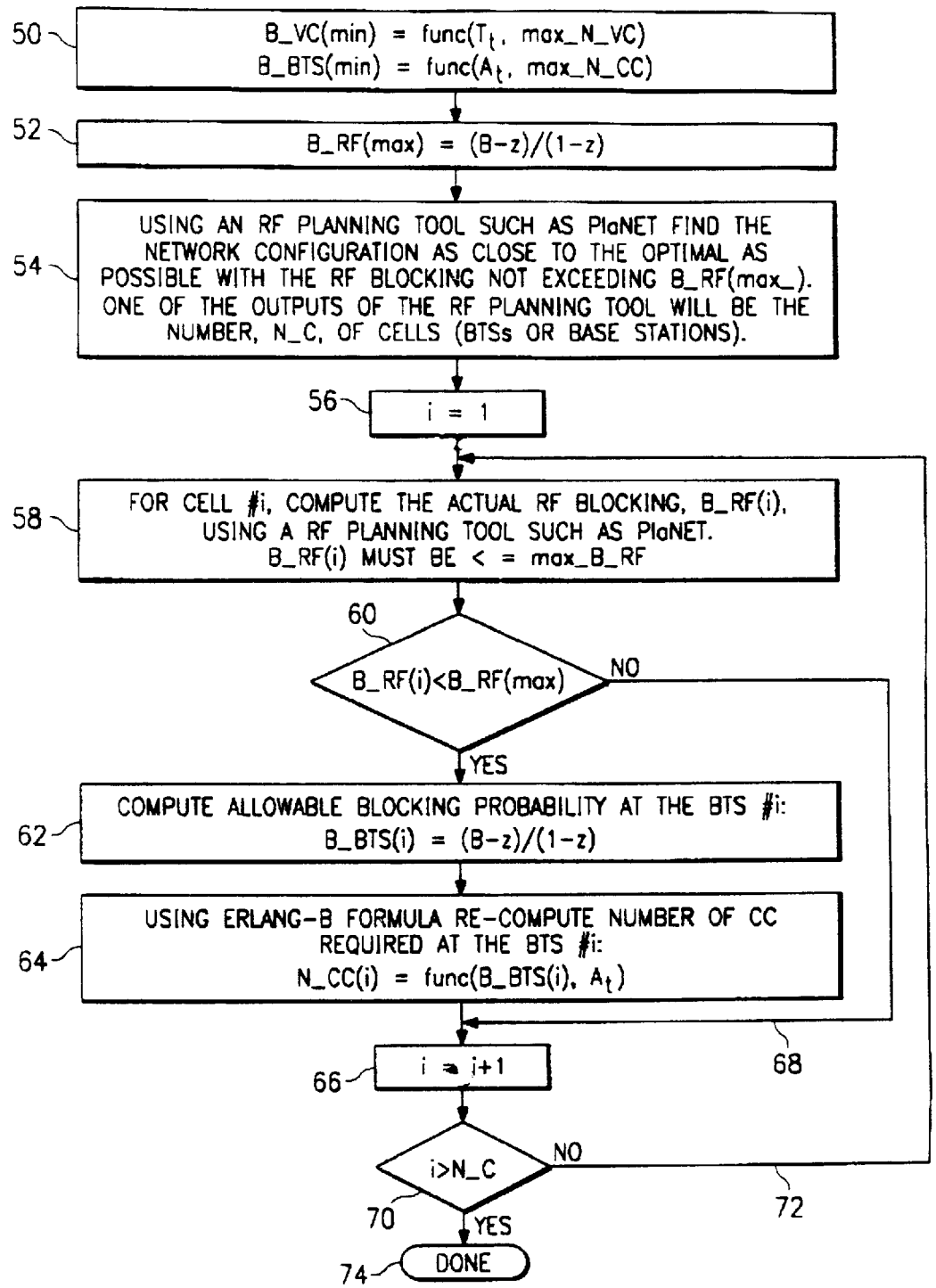
FIG. 2 is a flow diagram outlining one embodiment of a method of designing a cellular phone system in accordance with one embodiment of the present invention.

In FIG. 2, a design of a new cellular system commences in a block 50 once the total traffic $T_t$ in the new system is determined, the maximum permissible blocking probability (B) for RF and wired network portions of the system is decided upon, the maximum average traffic per cell $A_t$ is determined, the maximum number of vocoders (max_N_VC) that can be utilized in a switch such as 12 is ascertained, and the maximum number of channel elements (max_N_CC) that will be available in electronics of each base station such as 14 through 22 is determined. A minimum vocoder blocking probability B_VC(min) may be ascertained, using standard prior art techniques such as an Erlang B table, as a function of $T_t$ and max_N_VC. A minimum channel element blocking probability B_BTS(min) may also be ascertained, using the same prior art techniques, as a function of At and max_N_CC. These are standard procedures known to those using the PlaNET software mentioned above.

The next step, in block 52, is to calculate the maximum available blocking probability (B_RF(max)) of the RF portion of the system for each cell in the system. This value is determined as presented in equation 1.

$$B\_RF(\max)=(B-z)/(1-z) \quad (1)$$

where $$z=B_{13}VC(\min)+B\_BTS(\min)-(B\_VC(\min) * B\_BTS(\min))$$

The considerations of the RF portion of a system includes the number of communication channels available for customers and this number has no direct relationship to the number of channel elements in a base station. Further, the RF portion of blocking probability may include factors such as terrain which could cause dead spots, traffic density, etc. The next step, in block 54, is to plan, design or configure a system as close to optimal as possible using a RF planning tool such as PlaNET a software tool available from Mobile Systems International, Inc. of Richardson, Tex. A resulting design would be such that the RF blocking would not exceed (B_RF(max)) in any cell. A result of this design would be a determination of the number of cells ($N_{13}$ C) or base stations required to meet the parameters set up before system design commenced in block 54. In block 56, a variable "i" is set to 1 and the next step is set forth in block 58. Now that a system has been designed with a number of cells (N_C), it should be apparent to one skilled in the art that the actual RF blocking in at least some of the cells will normally be somewhat less than the maximum allowable value of (B_RF(max)). Thus an RF planning tool, which again may be PlaNET, is used to calculate actual RF blocking (B_RF(i)) for a first cell #i such as cell 14. The next step, in a decision block 60, is to determine if B_RF(i) is less than (B_RF(max)). If it is, the maximum allowable channel element blocking probability for that base station (B_BTS(i)) is computed in block 62 as set forth in equation 2.

$$B\_BTS(i)+(B-z)/(1-z) \quad (2)$$

where $$z=B_{13} RF(i)+B\_VC(\min)-(B\_RF(i) * B\_BTS(\min))$$

In other words the previously set maximum blocking probability B less the actual RF blocking probability and less the blocking probability of the vocoders in the block 12 provides the maximum allowable channel element blocking probability. In block 64, the number of channel elements (N_CC(i)) required to not exceed this new blocking probability, B_BTS(i), for this cell is determined using an Erlang-B table or formula as may be found in any good communication handbook. The process then proceeds to block 66 where "i" is incremented. If the decision block 60 determines that RF blocking B_RF(i) is not less than B_RF(max), a path 68 would have led directly to block 66 as shown. Decision block 70 checks to see if "i" equals the number of cells N_C and if it does not, a path 74 returns to block 58 to evaluate the parameters of the next cell. If decision block 70 results in a yes, the advancement to block 74 indicates the design process is completed.

OPERATION

As will be apparent from the above, the present inventive approach to system design is formulated using the thought process that three main elements or factors contribute to call blocking in a cellular system. These three elements are RF considerations (RF channels, terrain, traffic etc), the number of channel elements in each base station and the number of vocoders in a centralized switch. There is typically a given maximum allowable call blocking probability BP stated for a new system before a design commences. Each of these three factors can be adjusted to lower the call blocking probability, however, in every case, lowering the blocking probability for a given factor increases the total cost for that element or factor. Since the total call blocking has to be distributed between these three factors, reducing call blocking probability in one factor will necessarily raise the call blocking probability and cost of at least one of the other two factors. In view of the fact that the cost of obtaining a multiplicity of cell sites and constructing any necessary structures will always be more expensive than the cost of channel elements to be used therein or the vocoders residing in the main switch, the process for most systems designs should begin by giving the factor most contributing to system cost the largest value of blocking probability to reflect that this factor contributes the most to actual call blocking. However, system design is normally accomplished using some standardized design process, such as a computer program like PlaNET, using a given maximum value not to be exceeded for each cell. Since each cell has many different items contributing to call blocking, at least some of the cells are likely to have an actual RF blocking which is less than the maximum allowable (B_RF(max)) as set forth in the initial design process. The present invention allows for individual examination of each base site and decreasing the number channel elements in the base station to raise the total call blocking probability for that cell nearer to a value of (B_BTS(i)) as set forth in block 62 of FIG. 1.

Since explanatory numbers often make the understanding of a process clearer, a set of arbitrarily assumed values of blocking probability will be used in explaining the design process. For purposes of simplicity it may be assumed that a small cellular system such as that shown in FIG. 1 needs to be designed. It may also be assumed that the maximum call blocking given as allowable by the customer is 5%. The system designer will know the maximum number of vocoders that can be installed in block 12. Using the first formula in block 50, the designer may determine that the minimum call blocking, in block 12, (B_VC(min)) using the maximum number of vocoders is 0.8%. The system designer will also know the maximum number of channel elements that can be installed in a base station of the type that is to be used in the system design. As an example, assume that the maximum number of channel elements, max_N_CC, that could be used in a base station is 90. Use of the second formula may determine that when using the maximum number of channel elements, the call blocking through the base station itself is only 0.9%. Thus, the formula in block 52 indicates that (B_RF(max)) used in block 54 may be as high as 3.36%. The completion of the use of an RF planning tool as set forth in block 54 will determine how many cells, N_C, are required such that (B_RF(max)) is not exceeded for any cell. As shown there are 5 cells in FIG. 1. It may be assumed that (B_RF(i)) for cell 14 is actually 2.9%, cell 16 is 3.25%, cell 18 is 3.1% etc. It is apparent, using these assumed numbers, that if only four cells would have been used, rather than the five shown, the blocking probability for at least cell 16 and probably cell 18 would exceed the 3.36% maximum allowable value. Since B_RF(i) (2.9%) is less than B_RF(max) (3.36%), decision block 60 passes the process to block 62. In block 62, the allowable call blocking for the channel elements in base station 14 B_BTS(i) is calculated to be as high as 1.37%. A recomputation of N_CC in block 64 now indicates that only 60 channel elements could be used in base station 14 without exceeding a channel element blocking probability of 1.37%. Thus, the cost of 30 channel elements can be deleted from the cost of the system as originally designed in block 54. Since the computations for cell 14 were performed first, the process increments "i" in block 66 and uses path 72 to return to block 58 to compute an actual B_RF for cell 16. In the instance of cell 16, decision block 60 again passes the process to blocks 62 and 64, but the value of B_BTS would only be increased from 0.9% to 0.95%. This small increase in allowable call blocking probability may not allow any decrease in number of channel elements as determined in block 64.

In a typical system having a large number of cell sites, the recomputation process in blocks 58 to 64 may eliminate base station channel elements in a large majority of the cells of any newly designed system, thereby cutting costs of a variable secondary cost element after the most expensive variable cost element (cell sites) is determined in number and placement.

We have presented a flow diagram illustrating the design approach using a typical system where RF blocking is considered the most expensive call blocking variable. However, the important consideration in our approach is to design using a maximal allowable call blocking for the most expensive variable and initially use minimal call blocking designs for other less expensive variables. After an initial design is implemented, the actual call blocking obtained for each instance of the most expensive variable may allow a decrease in the number of elements in the next most expensive variable as it concerns that last mentioned instance.

Although the present invention and its advantages have been described in detail, it should be understood that various changes, substitutions and alterations can be made therein without departing from the spirit and scope of the invention as defined by the appended claims.

What is claimed is:

1. The method of designing a new cellular system having a given total blocking probability BP for the system comprising, the steps of:

a. assigning a minimum possible vocoder blocking probability value to B_VC;

b. assigning an initial minimum possible channel element blocking probability value to B_BTS;

c. assigning a RF blocking probability value to B_RF of (BP−z)/(1−z) where "z" equals the sum of the vocoder and channel element blocking probabilities less the product of the vocoder and channel element blocking probabilities;

d. designing a network configuration wherein RF blocking approaches B_RF for at least one cell but does not exceed B_RF in any of a plurality of N cells;

e. computing actual RF blocking for a first of said N cells and assigning same to $B\_RF_i$ where i=first cell;

f. computing the minimum number of channel elements for cell "i" based on a maximum allowable channel element blocking probability of $B\_BTS_i$=(BP−z)/(1−z) where "z" equals the sum of the radio frequency and vocoder blocking probabilities less the product of the radio frequency and vocoder blocking probabilities; and g. computing actual RF blocking $B\_RF_i$ and number of channel elements $B\_BTS_i$ in the manner set forth in paragraphs e and f for each of the remaining N−1 cells.

2. A method of designing a new cellular system having a given total blocking probability BP for both RF and wired network portions of the system, a total traffic in the system of $T_t$, an average expected traffic in each cell of $A_t$, a main switch having a maximum possible number of vocoders N_VC, and a maximum possible number of channel elements N_CC in a base station comprising, the steps of:

a. calculating a minimum vocoder blocking probability value B_VC as a function of $T_t$ and N_VC;

b. calculating a minimum channel element blocking probability value B_BTS as a function of $A_t$ and N_CC;

c. calculating a maximum RF blocking probability B_RF where B_RF=(BP−z)/(1−z) and where "z" equals the sum of the vocoder and channel element blocking probabilities less the product of the vocoder and channel element blocking probabilities;

d. designing a network configuration wherein RF blocking does not exceed B_RF in any of a designed N cells;

e. computing actual RF blocking for a first of said N cells and assigning same to $B\_RF_i$ where i=first cell;

f. computing the minimum number of channel elements for cell "i" based on a maximum allowable channel element blocking probability of $B\_BTS_i$=(BP−z)/(1−z) where "z" equals the sum of the radio frequency and vocoder blocking probabilities less the product of the radio frequency and vocoder blocking probabilities; and g. completing steps e and f for each of the remaining N−1 cells.

3. A computer programmed for designing a new cellular system having a given total blocking probability BP for both RF and wired network portions of the system, a total traffic in the system of $T_t$, an average expected traffic in each cell of $A_t$, a main switch having a maximum possible number of vocoders N_VC, and a maximum possible number of channel elements N_CC in each of a plurality of base stations comprising, in combination:

a. means for calculating a minimum vocoder blocking probability value B_VC as a function of $T_t$ and N_VC;

b. means for calculating a minimum channel element blocking probability value B_BTS as a function of $A_t$ and N_CC;

c. means for calculating a maximum RF blocking probability B_RF where B_RF=(BP−z)/(1−z) and where "z" equals the sum of the vocoder and channel element blocking probabilities less the product of the vocoder and channel element blocking probabilities;

d. means for configuring a network of N cells and a total traffic of $T_t$ wherein RF blocking does not exceed B_RF in any of the N cells;

e. means for computing actual RF blocking for a first of said N cells and assigning same to $B\_RF_i$ where i=first cell;

f. means for computing the minimum number of channel elements required for cell "i" based on a maximum allowable channel element blocking probability of $B\_BTS_i$=(BP−z)/(1−z) where "z" equals the sum of the radio frequency and vocoder blocking probabilities less the product of the radio frequency and vocoder blocking probabilities; and g. means for completing steps e. and f. for each of the remaining N−1 cells.

4. A method of designing a cellular radio system where BP represents the total call blocking probability of the system comprising, the steps of:

a. calculating a minimum vocoder blocking probability value B_VC as a function of total system traffic and maximum possible number of vocoders;

b. calculating a minimum channel element blocking probability value B_BTS as a function of average traffic per cell and the maximum possible number of channel elements in a base station of the cell;

c. calculating a maximum RF blocking probability B_RF where B_RF=(BP−z)/(1−z) and where "z" equals the sum of the vocoder and channel element blocking probabilities less the product of the vocoder and channel element blocking probabilities;

d. designing a network configuration wherein RF blocking does not exceed B_RF in any of the system cells;

e. computing actual RF blocking for a first one of said system cells and assigning same to $B\_RF_i$ where i=first cell;

f. computing the minimum number of channel elements for cell "i" based on a maximum allowable channel element blocking probability of $B\_BTS_i$=(BP−z)/(1−z) where "z" equals the sum of the radio frequency and vocoder blocking probabilities less the product of the radio frequency and vocoder blocking probabilities; and g. completing stops e. and f. for each of the remaining system cells.

5. A method of designing a cellular system network configuration for a system having a maximum call blocking probability of BP comprising, the steps of:

a. calculating a maximum RF blocking probability B_RF for each of N cells where B_RF=(BP−z)/(1−z) and where "z" equals the sum of the vocoder and channel element blocking probabilities less the product of the vocoder and channel element blocking probabilities, and where B_VC is indicative of minimum vocoder blocking probability using a maximum possible number of vocoders in a main switch and further where B_BTS is indicative of minimum channel element blocking probability using a maximum possible number of channel elements in a base station of each cell;

b. computing actual RF blocking for a first one of said N cells and assigning same to $B\_RF_i$ where i=first cell;

c. computing the minimum number of channel elements for cell "i" based on a maximum allowable channel element blocking probability of $B\_BTS_i$=(BP−z)/(1−z) where "z" equals the sum of the radio frequency and vocoder blocking probabilities less the product of the radio frequency and vocoder blocking probabilities; and d. completing steps b and c for each of the remaining N−1 system cells.

6. A method of designing a cellular system network for a system having a given maximum call blocking probability of BP wherein there are at least three variables X, Y and Z contributing to call blocking probability of BP where a minimum possible call blocking probability of X contributes the least to total system cost and where a minimum possible call blocking probability of Z contributes the most to total system cost comprising, the steps of:

a. calculating a minimum possible call blocking probability value BX for variable X;

b. calculating a minimum possible call blocking probability value BY for variable Y;

c. calculating a maximum possible call blocking probability BZ where BZ=(BP−z)/(1−z) where z=BX+BY−(BX*BY);

d. designing a network configuration wherein the call blocking in the system for variable Z does not exceed BZ in any part of the system;

e. computing actual call blocking due to variable Z for a first part of said system and assigning same to $BZ_i$ where i=first system part;

f. computing the minimum number of variable Y for system part "i" based on a maximum allowable call blocking probability of $BY_i=(BP-z)/(1-z)$ where $z=BX+BZ_i-(BX*BZ_i)$; and g. completing steps e. and f. for each of the remaining system parts.

7. A method of designing a cellular radio system having a maximum call blocking probability of BP comprising, the steps of:

a. calculating a minimum possible vocoder blocking probability value B_VC;

b. calculating an initially used minimum channel element blocking probability value B_BTS;

c. calculating a maximum RF blocking probability B_RF where $B\_RF=(BP-z)/(1-z)$ and where "z" equals the sum of the vocoder and channel element blocking probabilities less the product of the vocoder and channel element blocking probabilities;

d. designing a network configuration wherein RF blocking does not exceed B_RF in any of the system cells;

e. computing actual RF blocking for a first one of said system cells and assigning same to $B\_RF_i$ where i equals cell being considered;

f. computing the minimum possible number of channel elements for cell "i" based on a maximum allowable channel element blocking probability of $B\_BTS_i=(BP-z)/(1-z)$ where "z" equals the sum of the radio frequency and vocoder blocking probabilities less the product of the radio frequency and vocoder blocking probabilities; and g. completing steps e. and f. for each of the remaining system cells.

8. A computer programmed for designing a new cellular system having a maximum call blocking probability of BP comprising, in combination:

a. means for calculating a minimum possible vocoder blocking probability value B_VC;

b. means for calculating an initial minimum possible channel element blocking probability value B_BTS;

c. means for calculating a maximum RF blocking probability B_RF where $B\_RF=(BP-z)/(1-z)$ and where "z" equals the sum of the vocoder and channel element blocking probabilities less the product of the vocoder and channel element blocking probabilities;

d. means for configuring a network of cells wherein RF blocking does not exceed B_RF in any of the resultant configured plurality of N cells;

e. means for computing actual RF blocking for a first of said N cells and assigning same to $B\_RF_i$ where i=first cell;

f. means for computing the minimum number of channel elements required for cell "i" based on a maximum allowable channel element blocking probability of $B\_BTS_i=(BP-z)/(1-z)$ where "z" equals the sum of the radio frequency and vocoder blocking probabilities less the product of the radio frequency and vocoder blocking probabilities; and g. means for completing steps e. and f. for each of the remaining N-1 cells.

9. A cellular system having a total call blocking probability of BP and including a plurality of base stations wherein each base station has a call blocking probability of BCmin when equipped with a maximum possible number of channel elements comprising, in combination:

a switch including the maximum possible number of vocoders and having a call blocking probability of BV; and a plurality of base stations, said base stations linked to said switch, each said base station including channel elements, the number of channel elements in each base station being substantially equal to but not exceeding $(BP-z)/(1-z)$ where z equals the sum of BRF (the radio frequency minimum call blocking probability) and BV less the product of BV and BRF where the system was designed to provide a BRF of $(BP-z)/(1-z)$ where $z=BCmin+BV-(BCmin*BV)$.

10. A method of designing a cellular radio system having a maximum call blocking probability of BP comprising, the steps of:

a. determining a minimum possible vocoder blocking probability value BVC;

b. determining an initially used minimum channel element blocking probability value B_BTS;

c. determining a radio frequency blocking probability B_RF where $B\_RF=(BP-z)/(1-z)$ and where "z" equals the sum of the vocoder and channel element blocking probabilities less the product of the vocoder and channel element blocking probabilities;

d. designing a network configuration wherein radio frequency blocking does not exceed B_RF in any of the system cells;

e. determining actual radio frequency blocking for a first one of said system cells and assigning same to $B\_RF_i$ where i equals cell being considered;

f. determining the minimum possible number of channel elements for cell "i" based on a maximum allowable channel element blocking probability of $B\_BTS_i=(BP-z)/(1-z)$ where "z" equals the sum of the radio frequency and vocoder blocking probabilities less the product of the radio frequency and vocoder blocking probabilities; and g. completing steps e. and f. for each of the remaining system cells.

* * * * *

UNITED STATES PATENT AND TRADEMARK OFFICE
CERTIFICATE OF CORRECTION

PATENT NO. : 5,826,218
DATED : October 20, 1998
INVENTOR(S) : Khafizov et al.

It is certified that error appears in the above-identified patent and that said Letters Patent is hereby corrected as shown below:

Column 3, lines 9-10  Delete "z=B_VC+B_BTS-B$_{13}$ VC*B_BTS"
　　　　　　　　　　Insert --z=B_VC+B_BTS-B_VC*B_BTS--

Column 3, line 12    Delete "B_BF"
　　　　　　　　　　Insert --B_RF--

Column 4, line 4     Delete "At"
　　　　　　　　　　Insert --A$_t$--

Column 4, line 14    Delete "z=B$_{13}$VC(min)+B_BTS(min)-(B_VC(min) * B_BTS(min))"
　　　　　　　　　　Insert --z=B_VC(min)+B_BTS(min)-(B_VC(min) * B_BTS(min))--

UNITED STATES PATENT AND TRADEMARK OFFICE
CERTIFICATE OF CORRECTION

PATENT NO. : 5,826,218
DATED : October 20, 1998
INVENTOR(S) : Khafizov et al.

It is certified that error appears in the above-identified patent and that said Letters Patent is hereby corrected as shown below:

Column 4, line 28  Delete "$(N_{13} C)$"
Insert --$(N\_C)$--

Column 4, line 47  Delete "$z=B_{13}RF(i)+B\_VC(min)-(B\_RF(i) * B\_BTS (min))$"
Insert --$z=B\_RF(i)+B\_VC(min)-(B\_RF(i) * B\_BTS(min))$--

Signed and Sealed this

Fourteenth Day of December, 1999

Attest:

Q. TODD DICKINSON

*Attesting Officer*  *Acting Commissioner of Patents and Trademarks*